United States Patent
Li et al.

(10) Patent No.: US 10,513,759 B2
(45) Date of Patent: Dec. 24, 2019

(54) EVAPORATION-BASED METHOD FOR MANUFACTURING AND RECYCLING OF METAL MATRIX NANOCOMPOSITES

(71) Applicant: THE REGENTS OF THE UNIVERSITY OF CALIFORNIA, Oakland, CA (US)

(72) Inventors: Xiaochun Li, Manhattan Beach, CA (US); Lianyi Chen, Los Angeles, CA (US)

(73) Assignee: The Regents of the University of California, Oakland, CA (US)

(*) Notice: Subject to any disclaimer, the term of this patent is extended or adjusted under 35 U.S.C. 154(b) by 352 days.

(21) Appl. No.: 15/410,690

(22) Filed: Jan. 19, 2017

(65) Prior Publication Data
US 2017/0204500 A1    Jul. 20, 2017

Related U.S. Application Data

(60) Provisional application No. 62/280,536, filed on Jan. 19, 2016.

(51) Int. Cl.
C22C 23/04    (2006.01)
C22C 1/10    (2006.01)

(52) U.S. Cl.
CPC ...... *C22C 23/04* (2013.01); *C22C 2001/1047* (2013.01)

(58) Field of Classification Search
CPC . C22C 23/04; C22C 32/0036; C22C 32/0042; C22C 32/0063; C22C 2001/1047; Y02P 10/24; B82Y 30/00; B82Y 40/00; B22F 2009/001; B22F 2998/10
See application file for complete search history.

(56) References Cited

U.S. PATENT DOCUMENTS 9,023,128 B2    5/2015    Li et al.
2012/0121890 A1*    5/2012    Weiland ............... B22D 19/14
                                                428/323

OTHER PUBLICATIONS

Cao et al., Mg—6Zn/1.5%SiC nanocomposites fabricated by ultrasonic cavitation-based solidification processing, J Mater Sci (2008) 43:5521-5526. (Year: 2008).*
Chen, et al., "Achieving uniform distribution and dispersion of a high percentage of nanoparticles in metal matrix nanocomposites by solidification processing", Scripta Materialia 69: 634-637 (2013).
Chen, et al., "Novel nanoprocessing route for bulk graphene nanoplatelets reinforced metal matrix nanocomposites", Scripta Materialia 67: 29-32 (2012).
Chen, et al., "Processing and properties of magnesium containing a dense uniform dispersion of nanoparticles", Nature 528: 539-543 (2015).

(Continued)

*Primary Examiner* — Anthony J Zimmer
(74) *Attorney, Agent, or Firm* — Foley & Lardner LLP; Cliff Z. Liu

(57) ABSTRACT

A manufacturing method includes: 1) forming a melt including one or more metals; 2) introducing nanostructures into the melt at an initial volume fraction of the nanostructures; and 3) at least partially evaporating one or more metals from the melt so as to form a metal matrix nanocomposite including the nanostructures dispersed therein at a higher volume fraction than the initial volume fraction.

15 Claims, 7 Drawing Sheets

(56) References Cited

OTHER PUBLICATIONS

Ferguson, et al., "On the strength and strain to failure in particle-reinforced magnesium metal-matrix nanocomposites (Mg MMNCs)", Mater. Sci. Eng. A 558: 193-204 (2012).
Ferkel, et al., "Magnesium strengthened by SiC nanoparticles", Mater. Sci. Eng. A298: 193-199 (2001).
Liu, et al., "Nanostructured high-strength molybdenum alloys with unprecedented tensile ductility", Nature Materials 12: 344-350 (2013).
Mortensen, et al., "Metal Matrix Composites", Annu. Rev. Mater. Res. 40: 243-270 (2010).
Sillenkens, et al., "The ExoMet Project: EU/ESA Research on High-Performance Light-Metal Alloys and Nanocomposites", Metall. Mater. Trans. A45: 3349-3361 (2014).
Tjong, "Novel Nanoparticle-Reinforced Metal Matrix Composites with Enhanced Mechanical Properties", Adv. Eng. Mater. 9: 639-652 (2007).
Zhang, et al., "Consideration of Orowan strengthening effect in particulate-reinforced metal matrix nanocomposites: A model for predicting their yield strength", Scripta Materialia 54: 1321-1326 (2006).

\* cited by examiner

FIG. 5A  FIG. 5B  FIG. 5C
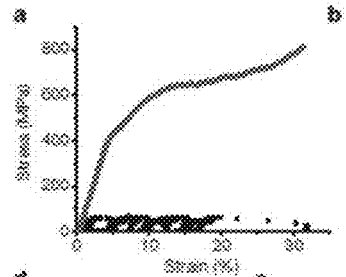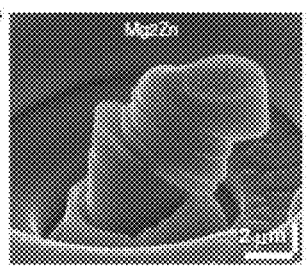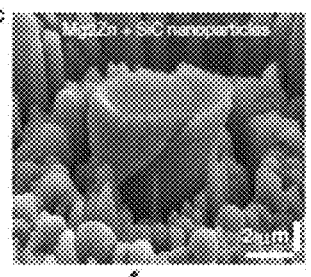
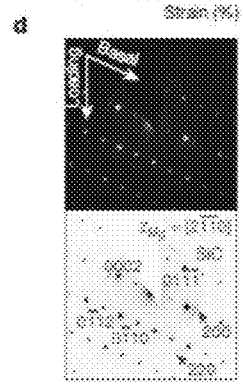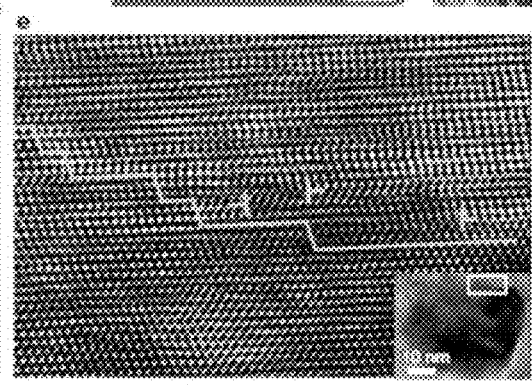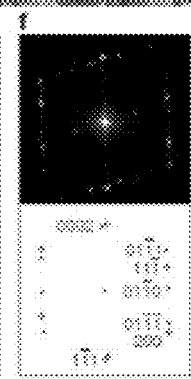
FIG. 5D  FIG. 5E  FIG. 5F
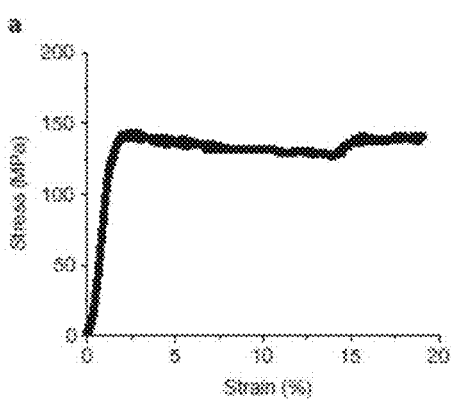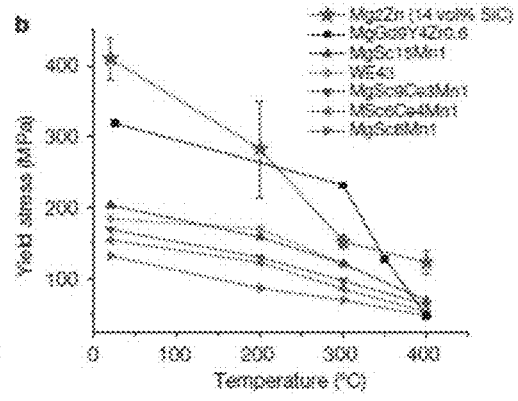
FIG. 6A  FIG. 6B FIG. 7A
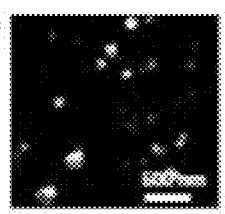
FIG. 7C
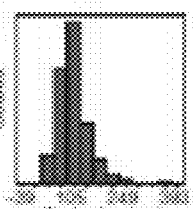
FIG. 7E
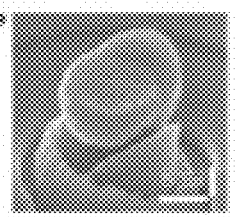
FIG. 7B
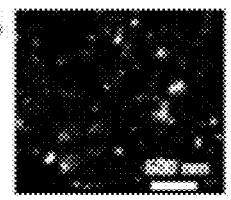
FIG. 7D
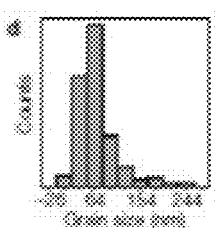
FIG. 7F
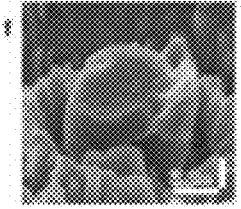
FIG. 7G
FIG. 7H
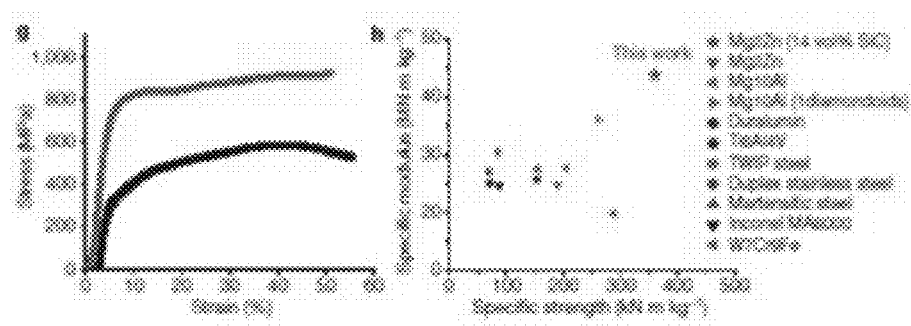

EVAPORATION-BASED METHOD FOR MANUFACTURING AND RECYCLING OF METAL MATRIX NANOCOMPOSITES

CROSS-REFERENCE TO RELATED APPLICATION

This application claims the benefit of U.S. Provisional Application No. 62/280,536, filed Jan. 19, 2016, the content of which is incorporated herein by reference in its entirety.

TECHNICAL FIELD

This disclosure generally relates to methods of manufacturing and recycling of metal matrix nanocomposites with a high volume fraction of uniformly dispersed nanoparticles.

BACKGROUND

Magnesium, the lightest structural metal with a density of about two-thirds of aluminum, is abundant on Earth and biocompatible, and thus widely considered as an emerging "green" metal with tremendous potential to improve energy efficiency and system performance from aerospace, defense, automobile, mobile electronics to biomedical applications. However, typical synthesis and processing methods (alloying, even with rare earth elements, and thermomechanical processing) have reached certain constraints in further improving the properties of magnesium, such as strength, low-temperature ductility and thermal stability, for widespread applications.

Properties of metals are typically controlled by alloying and thermomechanical processing. However, atomic vacancies and interstitials, dislocations, internal boundaries, and precipitates achievable for property tuning are constrained by phase diagrams and the intrinsic properties of a system. An example is the lightest structural metal, magnesium, which has great potential to improve fuel-efficiency and system performance due to its light weight properties. However, typical methods used to enhance properties are still generally not able to provide satisfactory property enhancement due to the difficulty in obtaining fine, strong and high temperature stable precipitates and high density internal boundaries (e.g., grain boundaries or twin boundaries). The low strength, low stiffness, and poor high temperature stability severely restrict the widespread applications of magnesium. To break the apparent property ceilings of magnesium, as well as other metals, much stronger ceramic particles can be introduced into metal matrices. Unfortunately, micrometer-sized ceramic particles severely deteriorate the plasticity and machinability of metals, and also fail to provide effective Orowan strengthening due to the large size and spacing between particles. One might expect that nanometer-sized ceramic particles have the potential to significantly improve strength while maintaining or even improving plasticity of metals by interacting with dislocations (Orowan strengthening) and grain/phase boundaries (Zener pinning). It has, however, been observed that dispersing nanoparticles uniformly in metal matrices, especially in magnesium, a prerequisite for significant property enhancement, is extremely difficult due to the lack of an engineered repulsive force between nanoparticles. High energy ball milling, the most effective technique for powder mixing, can disperse a low volume fraction (less than 3 vol. %) of nanoparticles in a metal matrix with optimized parameters, but micro-clustering is still a serious issue when the volume fraction of nanoparticles is high. High energy ball milling also suffers from contamination, demanding processing conditions to avoid explosion, and involving high cost and low production volume.

It is against this background that a need arose to develop the embodiments described herein.

SUMMARY

Here some embodiments of this disclosure show a remarkable enhancement of strength, stiffness, plasticity and high temperature stability, which are achieved simultaneously by populous dispersed nanoparticles in cast and thermomechanically-processed magnesium, delivering a highest specific strength and specific modulus among various structural crystalline metals. The uniform dispersion of a high volume fraction of silicon carbide (SiC) nanoparticles in a magnesium matrix is achieved through a nanoparticle self-stabilization mechanism in molten metal, which overcomes the long-standing challenge of dispersing nanoparticles in metal matrices. This approach of populous nanoparticle dispersion and strengthening paves a way to enhance the performance of metals to meet energy and sustainability challenges in today's society.

As described herein, some embodiments demonstrate that a uniform dispersion of a high volume fraction of SiC nanoparticles in magnesium matrix is achieved by liquid state processing through a thermally activated self-stabilization mechanism. The uniformly dispersed nanoparticles lead to remarkable property enhancement for the fabrication of magnesium with desirable mechanical properties.

Some embodiments described herein provide an approach to overcome the challenges of manufacturing and recycling of metal matrix nanocomposites. The approach provides a streamlined and scalable way for manufacturing of metal matrix nanocomposites with a high volume fraction of uniformly dispersed reinforcing nanoparticles. The metal matrix nanocomposites with uniformly dispersed high volume fraction of nanoparticles can be used as ultra-high performance structural materials or as master alloys for structural modification of other alloys. The approach can also be used to recycle metal matrix nanocomposites by separating the metal matrix nanocomposites to substantially pure metal or metal alloy and substantially pure nanoparticles.

One aspect of some embodiments of this disclosure is an evaporation-based method that is used to increase the volume fraction of nanoparticles in a metal matrix. The evaporation rate of materials can depend on temperature, vapor pressure of the materials, and pressure of an ambient environment. At a certain temperature and pressure, a molten metal evaporates at a high rate and nanoparticles remain in a melt. By tuning the temperature, pressure and processing time, the nanoparticles can be concentrated to a high volume fraction for manufacturing of metal matrix nanocomposites with a high percentage of a reinforcing phase, or the metal melt can be substantially completely evaporated for recycling of metal matrix nanocomposites by separating metal and nanoparticles.

The evaporation-based method has been tested and demonstrated using SiC nanoparticles in a magnesium matrix. In particular, a uniform dispersion of a high volume fraction of SiC nanoparticles in a magnesium matrix has been achieved using liquid state processing through a thermally activated self-stabilization mechanism. The uniformly dispersed nanoparticles lead to remarkable property enhancement for the fabrication of magnesium with desirable properties.

Embodiments described herein allow the manufacturing of ultra-high performance metal matrix nanocomposites with uniformly dispersed nanoparticles. Aerospace, automobile, defense, and electronics industries have increasing demands for lightweight, strong, ductile, and stiff structural materials. A high volume fraction of uniformly dispersed ceramic nanoparticles in a metal matrix can yield such materials.

Embodiments described herein also allow the formation of readily dissolvable master alloys with uniformly dispersed nanoparticles for structural modification in metal casting industry. Trace amount of nanoparticles can significantly modify the microstructure of casting alloys. However, it is a challenge to produce master alloys with a uniformly dispersed high volume fraction of nanoparticles. Master alloys produced by certain powder metallurgy methods cannot be readily dissolved and can contain a significant number of clusters. Embodiments described herein solve this challenge and allow the manufacturing of high quality master alloys.

Embodiments described herein also provide a solution for recycling of metal matrix nanocomposites. With an increasing usage of metal matrix nanocomposites, recycling of these nanocomposites will become increasingly important. Embodiments described herein provide an efficient method for recycling of metal matrix nanocomposites.

In some embodiments, a manufacturing method includes: 1) forming a melt including one or more metals; 2) introducing nanostructures into the melt at an initial volume fraction of the nanostructures; and 3) at least partially evaporating one or more metals from the melt so as to form a metal matrix nanocomposite including the nanostructures dispersed therein at a higher volume fraction than the initial volume fraction.

In some embodiments, the nanostructures are introduced into the melt at the initial volume fraction of no greater than about 3%.

In some embodiments, the nanocomposite includes the nanostructures dispersed therein at the higher volume fraction of at least about 5%.

In some embodiments, the melt includes two or more different metals.

In some embodiments, the melt includes magnesium and zinc.

In some embodiments, the melt includes one or more of zinc, magnesium, aluminum, iron, nickel, silver, copper, manganese, titanium, chromium, cobalt, gold, and platinum.

In some embodiments, introducing the nanostructures into the melt includes dispersing the nanostructures in the melt by agitation.

In some embodiments, the nanostructures include ceramic nanoparticles or metallic nanoparticles.

In some embodiments, the ceramic nanoparticles include a metal carbide or a non-metal carbide.

In some embodiments, the nanostructures have at least one dimension in a range of about 1 nm to about 100 nm.

In some embodiments, a manufacturing method includes: 1) forming a carrier melt including at least one carrier metal; 2) introducing nanostructures into the carrier melt to form a carrier mixture; 3) forming a matrix melt including at least one matrix metal different from the carrier metal; 4) introducing the carrier mixture into the matrix melt to form a carrier and matrix mixture having an initial volume fraction of the nanostructures dispersed therein; and 5) at least partially evaporating the carrier metal from the carrier and matrix mixture so as to form a metal matrix nanocomposite including the nanostructures dispersed therein at a higher volume fraction than the initial volume fraction.

In some embodiments, the initial volume fraction of the nanostructures is no greater than 3%, and the higher volume fraction of the nanostructures is at least 5%.

In some embodiments, a melting temperature of the matrix metal is greater than a melting temperature of the carrier metal.

In some embodiments, a metal matrix nanocomposite includes: 1) a matrix including magnesium; and 2) nanostructures dispersed in the matrix at a volume fraction of at least 5% of the nanocomposite.

In some embodiments, the matrix further includes at least one of zinc, aluminum, calcium, gadolinium, yttrium, tin, or silicon.

In some embodiments, the matrix includes an alloy of magnesium and zinc. In some embodiments, the matrix includes an alloy of magnesium and at least one of zinc, aluminum, calcium, gadolinium, yttrium, tin, or silicon.

In some embodiments, the nanostructures include ceramic nanoparticles or metallic nanoparticles.

In some embodiments, the ceramic nanoparticles include silicon carbide nanoparticles.

In some embodiments, the nanocomposite has a yield strength of at least about 300 MPa, at least about 350 MPa, at least about 400 MPa, at least about 450 MPa, at least about 500 MPa, at least about 550 MPa, at least about 600 MPa, at least about 650 MPa, or at least about 700 MPa, and up to about 750 MPa or greater.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

FIG. 5A illustrates engineering stress-strain curves of micro-pillar as-solidified samples without (lower curve) and with (top curve) nanoparticles.

FIG. 5B and FIG. 5C illustrate SEM images showing the morphology of post-deformed samples without (b) and with (c) SiC nanoparticles.

FIG. 5D illustrates in the top panel a representative selected area electron diffraction pattern taken from a thin-film FIB prepared from the Mg$_2$Zn (about 14 vol. % SiC) micro-pillar shown in FIG. 5C. Its indexed selected area electron diffraction pattern (bottom panel) reveals a single-crystal micro-pillar oriented to the [21̄1̄0] zone axis of the magnesium matrix, $z_{Mg}$. Note that the basal direction is forming an angle of about 65° with the loading direction.

FIG. 5E illustrates a Fourier-filtered high-resolution TEM image of the region marked by a white rectangle in the inset. The inset is a bright-field TEM image of a SiC nanoparticle. The SiC—Mg interface is highlighted by a solid line. Partial dislocations (marked) terminating in stacking faults are located on the basal planes. Interface steps take place on the {111} planes.

FIG. 5F illustrates in the top panel a fast Fourier transform of the image in the inset to FIG. 5E and the bottom panel shows its indexed fast Fourier transform showing the arrangement of spots corresponding to a SiC nanoparticle oriented to the [011] zone axis along with the spots corresponding to the magnesium matrix oriented to the [21̄1̄0] zone axis. The {111} planes of the SiC nanoparticle are parallel to the basal (0002) planes of the magnesium matrix. FIG. 5E and FIG. 5F have been rotated about 45° with respect to the original FIG. 5D for greater clarity.

FIG. 6A illustrates engineering stress-strain curve of Mg$_2$Zn (about 14 vol. % SiC) micro-pillars at about 400° C.

FIG. 6B illustrates yielding stress of Mg$_2$Zn (about 14 vol. % SiC) at elevated temperatures compared with other high-temperature magnesium alloys. Error bars represent standard deviation of at least three data sets.

FIG. 7A and FIG. 7B illustrate dark-field TEM images displaying the nanocrystalline grains of HPT processed samples without (a) and with (b) nanoparticles.

FIG. 7C and FIG. 7D are histograms indicating the grain size distribution in samples without (a) and with (b) nanoparticles.

FIG. 7E and FIG. 7F are SEM images showing the morphology of post deformed micro-pillars without (e) and with (f) nanoparticles.

FIG. 7G illustrates engineering stress-strain curves of HPT-processed magnesium samples without (lower curve) and with (upper curve) SiC nanoparticles.

FIG. 7H shows specific modulus versus specific yield strength of HPT-processed Mg$_2$Zn (about 14 vol. % SiC) in comparison with the results from micro-pillar testing of other metals and alloys.

DETAILED DESCRIPTION

Some embodiments of this disclosure are directed to metal matrix nanocomposites including a high volume fraction of uniformly dispersed nanostructures and methods of manufacturing of such nanocomposites. The metal matrix nanocomposites including uniformly dispersed, high volume fraction of nanostructures can be used as high performance structural materials or as master alloys for formation of such structural materials. In some embodiments, a metal matrix nanocomposite includes a matrix of one or more metals and reinforcing nanostructures dispersed in the matrix.

Figure 1A:
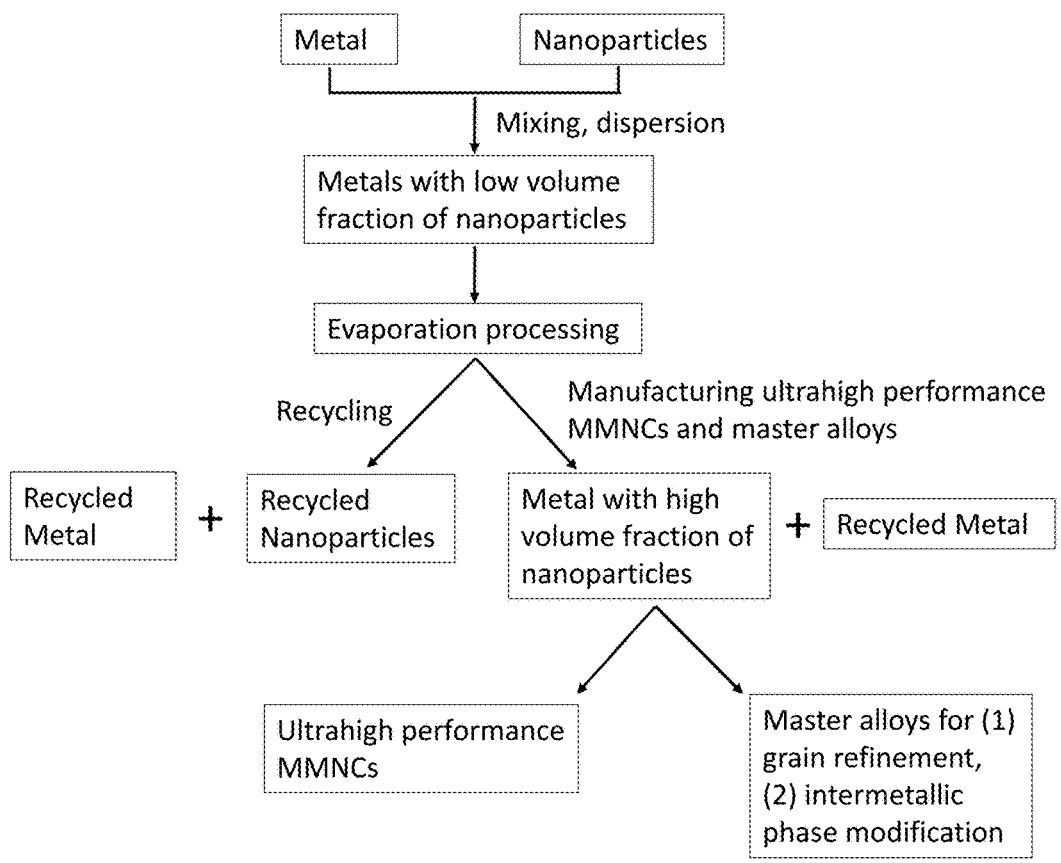
FIG. 1A illustrates a flow chart of an evaporation-based method for manufacturing and recycling of metal matrix nanocomposites.

FIG. 1A illustrates a flow chart illustrating an evaporation-based manufacturing method for manufacturing a metal matrix nanocomposite with a high volume fraction of nanoparticles or other nanostructures. As shown in FIG. 1A, one or more metals are heated to form a melt, and nanoparticles or other nanostructures are introduced into the melt so as to be dispersed in the melt at an initial, lower volume fraction of the nanoparticles. Examples of suitable metals include metals used for engineering materials, such as zinc (Zn), magnesium (Mg), aluminum (Al), iron (Fe), nickel (Ni), silver (Ag), copper (Cu), manganese (Mn), titanium (Ti), chromium (Cr), cobalt (Co), gold (Au), platinum (Pt), and mixtures, alloys, or other combinations of two or more of the foregoing metals. Nanostructures can have at least one dimension in a range of about 1 nm to about 1000 nm, such as about 1 nm to about 100 nm, about 1 nm to about 80 nm, about 1 nm to about 60 nm, about 1 nm to about 40 nm, about 1 nm to about 20 nm, or about 1 nm to about 10 nm, although other ranges within about 1 nm to about 1000 nm are contemplated, such as about 1 nm to about 500 nm or about 1 nm to about 200 nm. In some embodiments, nanostructures can have at least one average or median dimension in a range of about 1 nm to about 1000 nm, such as about 1 nm to about 100 nm, about 1 nm to about 80 nm, about 1 nm to about 60 nm, about 1 nm to about 40 nm, about 1 nm to about 20 nm, or about 1 nm to about 10 nm, although other ranges within about 1 nm to about 1000 nm are contemplated, such as about 1 nm to about 500 nm or about 1 nm to about 200 nm. In some embodiments, nanostructures can include nanoparticles having an aspect ratio of about 5 or less or about 3 or less or about 2 or less and having generally spherical or spheroidal shapes, although other shapes and configurations of nanostructures are contemplated, such as nanowires and nanosheets. Nanostructures can include or can be formed of a ceramic material. Examples of suitable ceramic materials include metal oxides (e.g., alkaline earth metal oxides, post-transition metal oxides, and transition metal oxides), non-metal oxides, metal carbides (e.g., transition metal carbides), non-metal carbides (e.g., SiC), metal silicides (e.g., transition metal silicides), metal borides (e.g., transition metal borides), metal nitrides (e.g., transition metal nitrides), alloys, mixtures, or other combinations of two or more of the foregoing. Nanostructures also can include or can be formed of one or more metals (e.g., selected from alkaline earth metals, post-transition metals, and transition metals), such as metallic nanoparticles.

Figure 2:
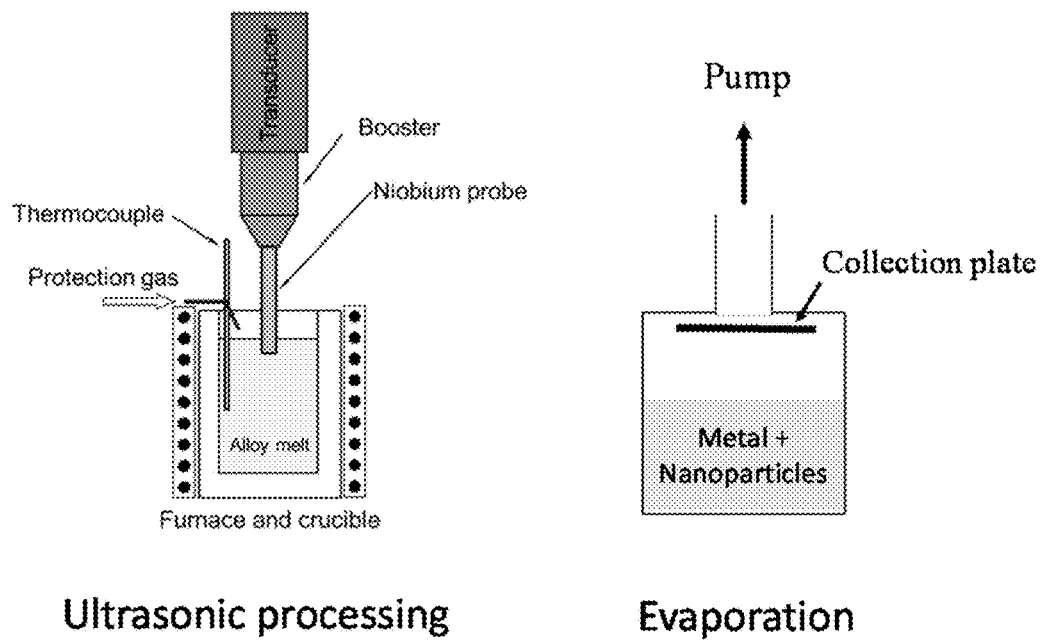
FIG. 2 illustrates particular stages of an evaporation-based method for manufacturing and recycling of metal matrix nanocomposites. The method includes ultrasonic dispersion of a low volume fraction of nanoparticles in molten metal followed by evaporation of the molten metal that increases (e.g., concentrates) a volume fraction of the nanoparticles in a resulting nanocomposite.

As shown in FIG. 1A, the melt and the nanoparticles are mixed using suitable agitation processing, such as ultrasonic processing with application of ultrasonic waves via a transducer as shown in FIG. 2 (left panel), although another manner of agitation can be used, such as high intensity shearing, centrifugation, or other mechanical agitation. In this regard, the one or more metals can be heated and melted in a furnace, and the nanoparticles can be introduced into the melt and mixed for dispersion of the nanoparticles in the melt to form a mixture having the initial, lower volume fraction of the nanoparticles. In some embodiments, the initial, lower volume fraction of the nanoparticles in the mixture is no greater than or less than about 3%, such as no greater than about 2.5%, no greater than about 2%, no greater than about 1.5%, or no greater than about 1%, and down to about 0.5% or less.

The mixture having the initial, lower volume fraction of the nanoparticles is then subjected to evaporation processing as illustrated in FIG. 1A and FIG. 2 (right panel) where vacuum evaporation, by operation of a vacuum pump in a furnace, of the one or more metals in the melt increases a concentration of the nanoparticles to form a resulting nanocomposite having a subsequent, higher volume fraction of the nanoparticles. During the evaporation processing, the nanoparticles are maintained in a dispersed state by suitable control of a processing temperature, and suitable control or material selection for wettability between the nanoparticles and the melt. The processing temperature can be controlled such that the melt remains in a liquid state (e.g., at or above a melting temperature of the one or more metals), and a pressure can be controlled to be at or below about 100 Torr, such as no greater than about 80 Torr, no greater than about 60 Torr, no greater than about 40 Torr, no greater than about 20 Torr, or no greater than about 10 Torr, and down to about 5 Torr or less. In some embodiments, the nanoparticles are introduced into the melt at the initial, lower volume fraction and then evaporation processing enriches the volume fraction of the nanoparticles to be greater than the initial, lower volume fraction, such as greater than about 3%, at least about 4%, at least about 5%, at least about 6%, at least about 7%, at least about 8%, at least about 9%, at least about 10%, at least about 11%, at least about 12%, at least about 13%, or at least about 14%, and up to about 20% or greater, and solidification by cooling forms a metal matrix nanocomposite with a dense, uniform dispersion of the nanoparticles. The method can be applied to a number of different metals. An example is Mg and in particular a magnesium zinc alloy. Other magnesium alloys are contemplated, such as an alloy of magnesium and one or more of zinc, aluminum, calcium, gadolinium, yttrium, tin, and silicon.

As shown in FIG. 2 (right panel), during the evaporation processing, an evaporated metal is condensed on a collection plate and can be recycled. The nanoparticles (e.g., ceramic nanoparticles) remain in a crucible due to the nanoparticles being stable at the processing temperature and are not evaporated. As a result of the evaporation processing, what remains is a metal matrix nanocomposite (MMNC) including a matrix of one or more metals and a high volume fraction of the nanoparticles dispersed in the matrix, or substantially pure nanoparticles (e.g., a volume fraction greater than about 90% or greater than about 95% in the event of substantially complete evaporation), which can be controlled by selecting evaporation conditions. The nanocomposite with the high volume fraction of the nanoparticles can be used as an ultra-high performance structural material or as a master alloy for further grain refinement or intermetallic phase modification. In some embodiments, the nanocomposite can be subjected to further processing, such as high pressure torsion. If the evaporation is substantially complete, the substantially pure nanoparticles remain in the crucible, which can be recycled and used as a feedstock for the formation of metal matrix nanocomposites or other materials.

Figure 1B:
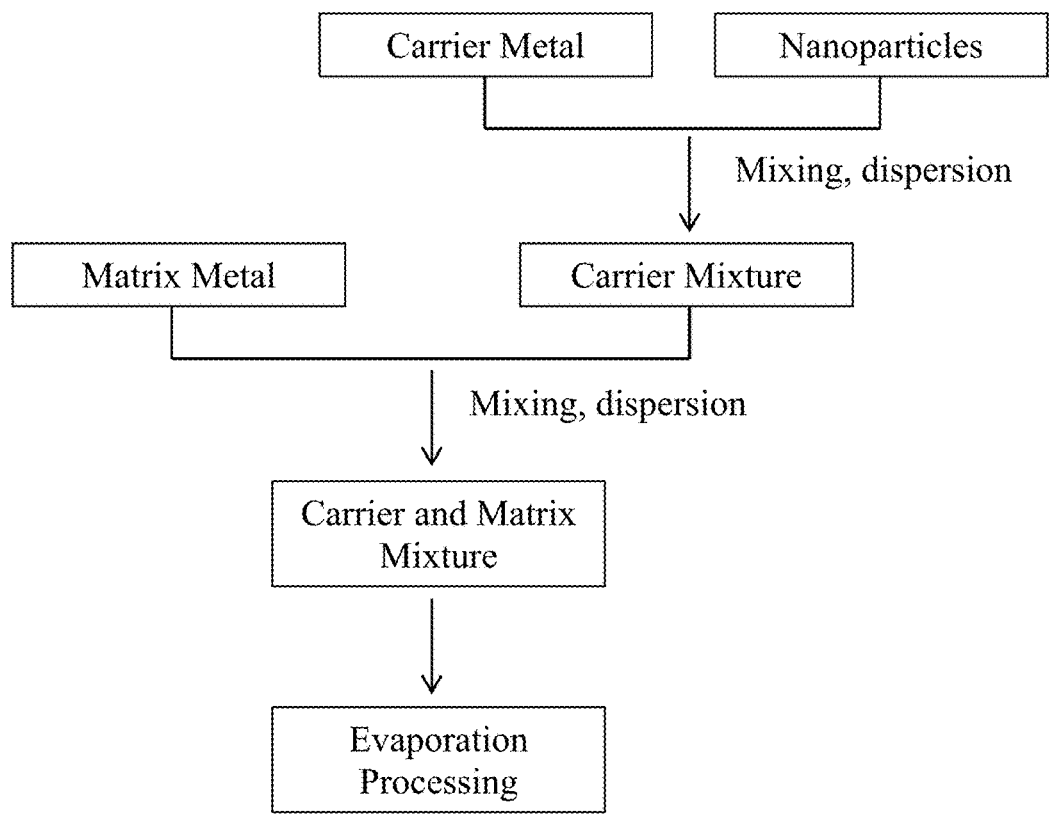
FIG. 1B illustrates a flow chart of another evaporation-based method for manufacturing and recycling of metal matrix nanocomposites.

FIG. 1B illustrates a flow chart illustrating another evaporation-based manufacturing method for manufacturing a metal matrix nanocomposite with a high volume fraction of nanoparticles or other nanostructures. As shown in FIG. 1B, one or more carrier metals are heated to form a carrier melt, and nanoparticles or other nanostructures are introduced into the carrier melt so as to be dispersed in the carrier melt. The one or more carrier metals are selected to facilitate dispersion of the nanoparticles, and are selected to be more readily and preferentially evaporated in subsequent evaporation processing. Examples of suitable carrier metals include metals having melting temperatures at or below about 1300° C., such as Zn, Mg, Al, and mixtures, alloys, or other combinations of two or more of the foregoing metals. The carrier melt and the nanoparticles are mixed using suitable agitation processing, such as ultrasonic processing with application of ultrasonic waves via a transducer as shown in FIG. 2 (left panel), although another manner of agitation can be used, such as high intensity shearing, centrifugation, or other mechanical agitation. In this regard, the one or more carrier metals can be heated and melted in a furnace, and the nanoparticles can be introduced into the carrier melt and mixed for dispersion of the nanoparticles in the carrier melt to form a carrier mixture. The carrier mixture can be solidified prior to further processing.

Next, as shown in FIG. 1B, one or more matrix metals are heated to form a matrix melt, and the carrier mixture (including the one or more carrier metals and the nanoparticles dispersed therein) is introduced into the matrix melt. Examples of suitable matrix metals include metals having melting temperatures greater than about 1300° C., such as Fe, Ni, Ag, Cu, Mn, Ti, Cr, Co, Au, Pt, and mixtures, alloys, or other combinations of two or more of the foregoing metals. The matrix melt and the carrier mixture are mixed using suitable agitation processing, such as ultrasonic processing with application of ultrasonic waves via a transducer as shown in FIG. 2 (left panel), although another manner of agitation can be used, such as high intensity shearing, centrifugation, or other mechanical agitation. In this regard, the one or more matrix metals can be heated and melted in a furnace, and the carrier mixture can be introduced into the matrix melt and mixed for dispersion of the nanoparticles in the matrix melt to form a carrier and matrix mixture having an initial, lower volume fraction of the nanoparticles. In some embodiments, the initial, lower volume fraction of the nanoparticles in the mixture is no greater than or less than about 3%, such as no greater than about 2.5%, no greater than about 2%, no greater than about 1.5%, or no greater than about 1%, and down to about 0.5% or less.

The carrier and matrix mixture having the initial, lower volume fraction of the nanoparticles is then subjected to evaporation processing as illustrated in FIG. 1B and FIG. 2 (right panel) where vacuum evaporation, by operation of a vacuum pump in a furnace, preferentially evaporates or removes the one or more carrier metals from the mixture and increases a concentration of the nanoparticles to form a resulting nanocomposite having a higher volume fraction of the nanoparticles dispersed in a matrix including the one or more matrix metals. In some embodiments, evaporation processing is performed at a processing temperature below a melting temperature of one or more matrix metals, and at or above a melting temperature of one or more carrier metals. In some embodiments, evaporation processing enriches the volume fraction of the nanoparticles to be greater than the initial, lower volume fraction, such as greater than about 3%, at least about 4%, at least about 5%, at least about 6%, at least about 7%, at least about 8%, at least about 9%, at least about 10%, at least about 11%, at least about 12%, at least about 13%, or at least about 14%, and up to about 20% or greater, and solidification by cooling forms the nanocomposite with a dense, uniform dispersion of the nanoparticles. Processing for recycling or for use as a structural material or a master alloy can be similarly performed as explained in connection with FIG. 1A, and details of the processing are not repeated.

Example

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Processing and Properties of Magnesium Including a Dense Uniform Dispersion of Nanoparticles The evaporation-based method was applied for enhancing mechanical properties of magnesium alloys. In particular, the method was used to achieve a uniform dispersion of SiC nanoparticles in a magnesium matrix. The SiC nanoparticles (about 1 vol. % of a melt and with an average diameter of about 60 nm) are first fed into a $Mg_6Zn$ (Mg and about 6 wt. % of Zn) melt by tube feeding, wetted and dispersed by ultrasonic processing under a protection of flowing $CO_2$ and $SF_6$. After a slow solidification, $Mg_6Zn$ (about 1 vol. % SiC) ingot is obtained. The nanoparticles are mostly distributed along a grain boundary region (the last solidified region) due to the pushing of nanoparticles by a solidification front during solidification. The segregation of SiC nanoparticles during solidification prohibits a uniform dispersion of nanoparticles in the solidified magnesium sample. The pushing of nanoparticles by a solidification front can be effectively countered by a higher viscosity drag force in a melt via the introduction of a high volume fraction of nanoparticles (e.g., > about 6 vol. %). Typically, low volume fractions of nanoparticles can be uniformly dispersed by ultrasonic processing including a combination of ultrasonic cavitation (to disperse nanoparticles) and acoustic streaming (to provide continuous material flow through a cavitation zone). Acoustic streaming, however, is generally not effective in a melt with a high volume fraction of nanoparticles due to the increased viscosity.

Therefore, to achieve a high volume fraction of nanoparticles in the magnesium melt, the nanoparticles are concentrated by evaporating away Mg and Zn from the $Mg_6Zn$-1 vol. % SiC ingot at about 6 Torr in a furnace. After evaporation and slow cooling, a sample with a high volume fraction of dispersed nanoparticles (about 14 vol. %) in a matrix composition of $Mg_2Zn$ (Mg and about 2 wt. % of Zn) is obtained. The chemical composition is determined from EDX (energy-dispersive X-ray spectroscopy) analysis and the volume fraction of nanoparticles is measured from the area fraction of nanoparticles in scanning electron microscopy (SEM) images.

Figure 3A:
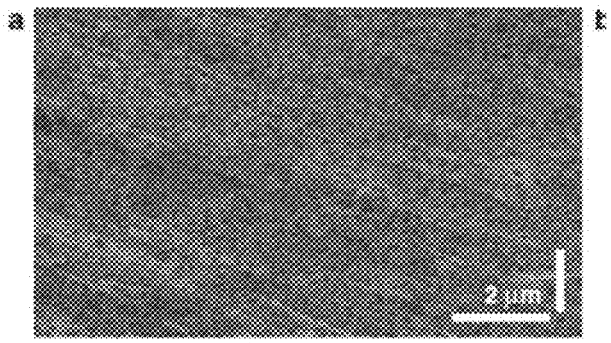
FIG. 3A and FIG. 3B illustrate SEM images of a $Mg_2Zn$ (about 14 vol. % SiC) sample acquired at about 52° C. tilt angle and at different magnifications showing a uniform distribution and dispersion of SiC nanoparticles in a magnesium matrix.
Figure 3B:
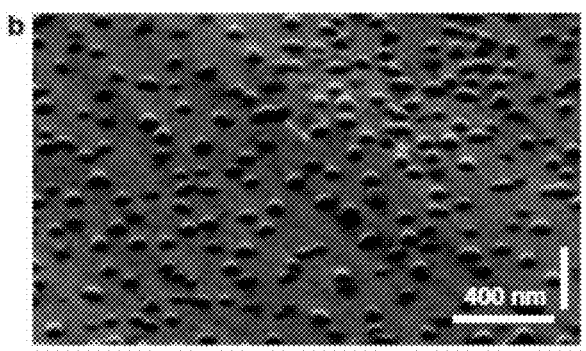
Figure 3C:
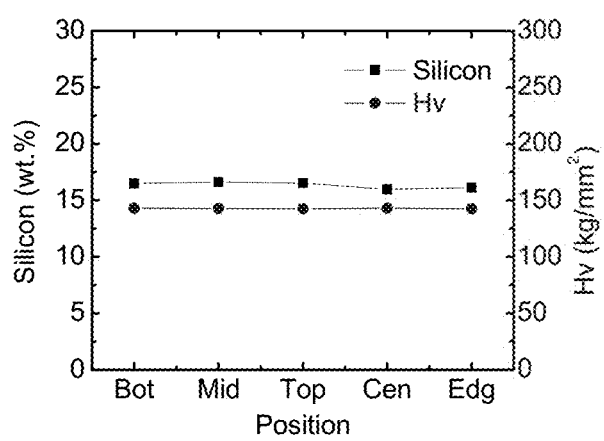
FIG. 3C illustrates a plot showing Vickers microhardness (Hv) and an amount of Si (wt. %) as a function of position in a sample.
Figure 3D:
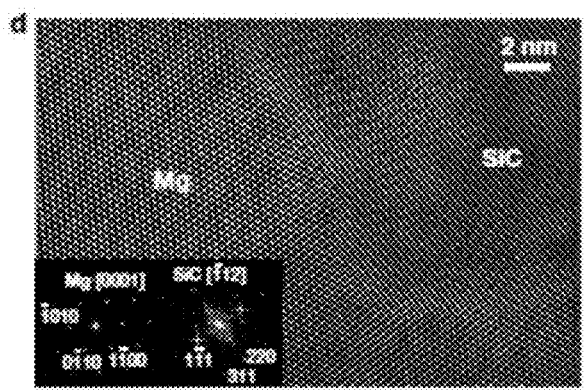
FIG. 3D illustrates a Fourier-filtered atomic-resolution TEM image showing a characteristic interface between a SiC nanoparticle and a magnesium matrix. Insets are fast Fourier transforms of the magnesium matrix (left) and the SiC nanoparticle (right), oriented to the [0001] and [112] zone axes, respectively.

Characterization is performed of the distribution of nanoparticles in a cast magnesium matrix by SEM. To reveal the nanoparticles clearly, the SEM samples were first cleaned by low angle ion milling (about 10 degrees, to remove nano-sized polishing powders) and then slightly etched by gallium ions (about 90 degrees, to preferentially etch magnesium matrix) by a focused ion beam. The SEM images were taken with a tilt angle of about 52 degrees to show the nanoparticles exposed on the surface of the magnesium matrix. It is remarkable that the high volume fraction of nanoparticles distribute and disperse uniformly in the magnesium matrix, as shown in FIG. 3A and FIG. 3B. To further confirm that the nanoparticles are distributed uniformly in the whole sample, the microhardness and silicon concentration at different parts of a sample were measured. FIG. 3C shows that the microhardness value and weight percentage of silicon are substantially uniform from top to bottom and center to edge of the sample, which validate the uniform distribution of high volume fraction of SiC nanoparticles in the magnesium matrix after solidification processing. The high resolution transmission electron microscopy (TEM) image of the interface region indicates a coherent bonding between a SiC nanoparticle and the magnesium matrix, as shown in FIG. 3D.

Figure 4:
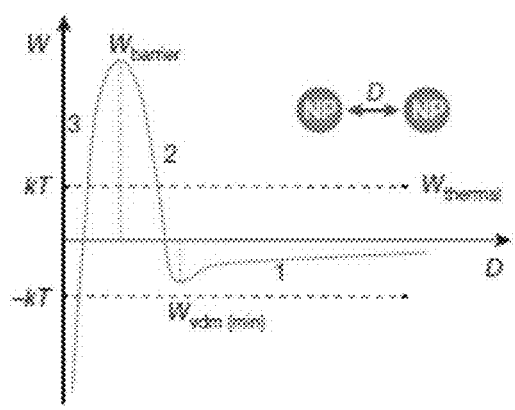
FIG. 4 illustrates the principle of thermally activated dispersion and stabilization for SiC nanoparticles in a magnesium melt. The interaction potential W for two SiC nanoparticles (NPs; circles, separated by a distance D) that interact inside the magnesium melt is shown as the solid curve, which has three segments (labeled). Segment 1 is dominated by van der Waals interaction, segment 2 is dominated by the interfacial energy increase when the Mg—SiC interface is replaced by SiC surfaces, and segment 3 is the interfacial energy drop due to SiC nanoparticles contacting and sintering. $W_{vdw}$ (min) is the minimum van der Waals potential for maximum attraction, $W_{barrier}$ is the energy barrier due to the interfacial energy increase, and $W_{thermal}=kT$ is the thermal energy.

The uniform dispersion of nanoparticles in the solidified samples provides convincing evidence that the SiC nanoparticles are dispersed and self-stabilized in the molten magnesium. Ceramic nanoparticles generally tend to form micrometer-sized clusters and then segregate after ultrasonic processing stops due to attractive van der Waals forces between nanoparticles. It is quite difficult to obtain an effective repulsive force between nanoparticles by electrical double layer or surfactants in high temperature and highly conductive molten metals. Surprisingly, even though a sample remained in the liquid state without ultrasonic processing for about 4 hours during the evaporation stage, the nanoparticles are still uniformly dispersed. A theoretical analyses shows that the self-stabilization of nanoparticles is attributed to a combination of (1) a wetting angle of about 83 degrees between the SiC nanoparticles and molten magnesium at the processing temperature, which creates an energy barrier to mitigate against an atomic-scale contact and sintering of SiC nanoparticles at high temperature, (2) a small difference in Hamaker constants between the SiC nanoparticles and molten magnesium that lowers the attractive van der Waals force, and (3) a high thermal energy such that the SiC nanoparticles are free from the van der Waals attraction, as schematically shown in FIG. 4. Theoretical details are discussed in the Supplementary Information below. This thermally-activated dispersion mechanism provides a new pathway to achieve a uniform dispersion of high volume fraction nanoparticles when a repulsive force is not available through other methods.

To investigate the property enhancement induced by the high volume fraction of nanoparticles, in-situ micro-pillar compression testing in SEM is conducted on as-solidified samples (see FIGS. 5A-5F). The size of the micro-pillar (about 4 μm in diameter and about 8 μm in length) was designed to contain just one grain to avoid the effect of grain boundaries on strengthening. This allows evaluation of the property enhancement induced by nanoparticles without the interference of grain boundaries for the cast samples. The size of the micro-pillar was also carefully selected to avoid size-induced strengthening, and to provide results comparable to macro-scale tests for magnesium alloys. To investigate the effect of nanoparticles on basal slip, the orientation of the pillars was chosen to favor basal slip. The test results show that the $Mg_2Zn$ samples without nanoparticles yield at about 50 MPa, then experience repeated loading-unloading cycles due to severe basal slipping, as shown in FIG. 5A. In contrast, the samples with nanoparticles yield at a significantly higher strength of about 410 MPa, and bear gradually increasing load smoothly to a plastic strain of over 30%, as shown in FIG. 5A. Moreover, after deformation, multiple slip traces are observed in the samples without nanoparticles, but a single major slip trace developed at the later stage of deformation is observed in the samples with nanoparticles. Even after the formation of the major slip trace, the samples with nanoparticles can still bear load smoothly, which indicates the stability of the basal slip. The testing results demonstrate that the uniformly dispersed nanoparticles can significantly strengthen the material and also can provide a more uniform and stable deformation by controlling the basal slip. The TEM evaluation reveals that the significant strengthening and effective suppression of basal slip originate from the blocking of dislocations by the high density and uniformly dispersed nanoparticles (FIGS. 5D, 5E) and effective load bearing provided by strong interfacial bonding at the Mg—SiC interface (FIG. 3D). The contributing strengthening mechanisms are further discussed in the Supplementary Information.

Strengthening magnesium at high temperatures is a grand challenge. Precipitates obtained by heat treatment for strengthening tend to dissolve or grow at elevated temperatures, which leads to the loss of strengthening effect. The strength of magnesium alloys drops rapidly above about 300° C. even for the most heat resistant alloys with rare earth elements. Magnesium alloys with a yield strength reaching about 100 MPa at about 400° C. have not been reported. Ceramic nanoparticles, with the ability to sustain a high temperature of up to melting point of a matrix, can provide an effective way to strengthen materials at elevated temperatures. To evaluate the high temperature property of the $Mg_2Zn$-14 vol. % SiC sample, the micro-pillar compression tests are conducted at about 200° C., about 300° C., and about 400° C. in a SEM chamber. The results show that the $Mg_2Zn$-14 vol. % SiC sample exhibits superior high temperature strength. The yield strength reaches about 123 MPa at about 400° C., which is about two times higher than other reported heat resistant magnesium alloys, as shown in FIG. 6A and FIG. 6B.

The effect of uniformly dispersed nanoparticles on the structural refinement by thermomechanical processing for further strengthening is investigated by high pressure torsion (details are presented in the Supplementary Information). As shown in FIG. 7D, the grain size of the matrix is refined to about 64 nm in the $Mg_2Zn$-14 vol. % SiC sample, which is finer than in the pure $Mg_2Zn$ sample without nanoparticles (with an average grain size of about 105 nm; FIG. 7C). Consequently, an additional strength enhancement of about 300 MPa is achieved by the high pressure torsion process, while about 286 MPa additional enhancement is achieved for the samples without nanoparticles. This indicates that the uniformly dispersed nanoparticles may serve as additional dislocation sources for dislocation cells that form into more grains during high pressure torsion. With the combined strengthening by uniformly dispersed nanoparticles and grain refinement after high pressure torsion (HPT), the $Mg_2Zn$-14 vol. % SiC sample exhibits a remarkable yield strength of about 710 MPa (the highest among various magnesium alloys and their composites). Furthermore, the high volume fraction of SiC nanoparticles also provides a significant enhancement of the Young's modulus (tested by micro-indentation and discussed in the Supplementary Information) from about 44 GPa in $Mg_2Zn$ to about 86 MPa in $Mg_2Zn$-14 vol. % SiC. Thus, the $Mg_2Zn$-14 vol. % SiC sample exhibits the highest specific strength and specific modulus among various structural crystalline metals, as shown in FIG. 7H.

The self-stabilization of nanoparticles in molten metal reported in this example paves the way for achieving a uniform dispersion of high volume fraction nanoparticles in a metal matrix, and opens up approaches to design metals with simultaneously enhanced strength, elastic modulus, plasticity and high temperature property. It is especially of significance to develop ultra-high performance lightweight metals for improving energy efficiency and system performance in numerous applications.

Supplementary Information:

Fabrication of Nanocomposites $Mg_6Zn$ alloy was melted in an alumina crucible under the protection of $CO_2$ (about 99 vol. %) and $SF_6$ (about 1 vol. %). SiC nanoparticles were fed into the $Mg_6Zn$ alloy melt to about 1.0 vol. % and dispersed by ultrasonic processing with a frequency of about 20 kHz and a peak-to-peak amplitude of about 60 μm at about 700° C. After a slow solidification, a $Mg_6Zn$ (about 1 vol. % SiC) ingot was obtained. To achieve a high volume fraction of nanoparticles in the magnesium melt, SiC nanoparticles were concentrated by evaporating away magnesium and zinc from the $Mg_6Zn$ (about 1 vol. % SiC) ingot (about 20 g) at about 6 Torr in a vacuum furnace. Then the samples (about 1.5 g) were cooled down slowly (with a cooling rate measured by a thermocouple of about 0.23 K $s^{-1}$) to room temperature inside the furnace.

To further enhance the strength of the materials, HPT was used as a secondary process. HPT, a method of severe plastic deformation, is effective in grain refinement of various materials and therefore elevates their strength based on the Hall-Petch relationship. As-solidified magnesium alloys were punched into about 10-mm-diameter disks. HPT was applied to each disk at room temperature with an imposed pressure of about 1.0 GPa for ten revolutions at about 1.5 r.p.m. to obtain sufficient grain refinement, to reduce the influence of initial grain size on final grain size and to achieve more homogeneous deformation along the radial direction.

Structural Characterization

The distribution and dispersion of SiC nanoparticles were studied by SEM and TEM. To clearly reveal the nanoparticles, the SEM samples were first cleaned by low-angle ion milling (about 10°, to remove the nanometer-sized polishing powders) and then slightly etched by gallium ions (about 90°, to preferentially etch magnesium matrix) by focused ion beam (FIB). The SEM images were acquired at about 52° tilt to expose the nanoparticles on the surface of the magnesium matrix. The composition of the materials was evaluated by energy-dispersive X-ray spectroscopy. The analysis was conducted with a FEI Nova 230 Variable Pressure SEM (VP-SEM) equipped with a Thermo Fisher Scientific energy-dispersive X-ray spectroscopy system at an accelerating voltage of about 15 kV. The nanoparticles-magnesium matrix interfaces, the orientation of micro-pillars for mechanical testing, and the grain size in samples after high-pressure torsion were investigated by TEM. A FEI-Titan scanning TEM operated at about 300 kV was used for this purpose. Thin-foil TEM samples were prepared by FIB.

Mechanical Characterization

Microcompression tests were conducted at room temperature under displacement control mode and at a strain rate of about $2 \times 10^{-3}$ $s^{-1}$. A PI 85 SEM PicoIndenter (Hysitron Inc.) with an about 5 μm flat punch diamond probe inside a FEI Nova 600 Nanolab Dual-Beam FIB-SEM was used for in situ experiments on about 4 μm micro-pillars. An MTS Nanoindenter with a flat punch tip was used for microcompression testing on about 9 μm diameter micro-pillars. Micro-pillars of about 4 μm and about 9 μm in diameter (about 8 μm and about 18 μm in length, respectively) were machined by FIB from the as-solidified samples with and without SiC nanoparticles and after HPT.

In situ quasi-static compression experiments were conducted using a PI 85 SEM PicoIndenter (Hysitron, Inc., USA) with an about 20 μm flat punch diamond probe inside an SEM (Versa 3D FIBSEM, FEI Company, USA). TriboScan software (Hysitron, Inc., USA) was used to monitor, capture and analyze the load-displacement data. The load-displacement data and the real-time video of deformation were synchronized and recorded during the experiment, which aided the post-experimental analysis. In situ heating was conducted through the use of a resistive MEMS-based heater which facilitates heating of a sample up to about 450° C. An integrated thin film of Pt on quartz structure was used as heating element. Temperature was actively measured and feedback-controlled using RTD (resistance temperature detector) sensor to ensure that the desired temperature is achieved and maintained within about 0.1° C. The sample was mounted using high-temperature conductive epoxy, EpoTek. Due to the small size of the heating system, the region of elevated temperature is highly localized which reduces extraneous heating of system components and provides an enhanced level of stability for mechanical testing. To achieve thermal equilibrium between the probe and the sample, the probe was contacted with micro-pillars using about 10 μN load for about 300 s before testing. In addition, thermal drift was also monitored and analyzed for a preset time before each test, and the measured drift rate was considered to correct the load-displacement data. Compression experiments at about 200° C., about 300° C. and about 400° C. were conducted on micro-pillars with diameter of about 4 μm and length of about 8 μm using displacement control mode to a maximum strain of about 25% with a strain rate of about $2 \times 10^{-3}$ s$^{-1}$.

Microindentation tests with an indent depth of about 2 μm were performed to evaluate the elastic modulus from the unloading curves. An MTS Nanoindenter XP with a Berkovich tip was used. Vickers hardness measurements were made under loads of about 4.9 N with a dwelling time of about 10 s.

Strengthening Mechanism

Possible strengthening mechanisms in metal matrix nanocomposites include Orowan strengthening, increased dislocation density due to mismatch of thermal expansion coefficient, load bearing and Hall-Petch strengthening. The possible strengthening mechanism in the as-cast and HPT-processed samples are discussed below.

Strengthening Mechanism in as-Cast Sample.

The total strengthening induced by nanoparticles in as-cast sample is about 360 MPa. The as-cast samples tested are single crystal and with substantially the same sample size for samples with and without nanoparticles; thus, there is no noticeable Hall-Petch strengthening. Observation was not made of the increased dislocation density around nanoparticles by TEM. This may be due to the size of the nanoparticles being too small to generate enough strain to induce dislocations around nanoparticles or the dislocations are annealed during very slow cooling inside the furnace. Thus, there is no noticeable strengthening from increased dislocation density due to mismatch of thermal expansion coefficient.

The yield strength increase from Orowan strengthening ($\Delta\sigma_{Orowan}$) induced by well dispersed particles can be calculated by the following equation:

$$\Delta\sigma_{Orowan} = \frac{\varphi G_m b}{d_p} \left(\frac{6V_p}{\pi}\right)^{1/3}$$

where $G_m$, b, $V_p$, $d_p$ are the shear modulus of matrix, Burgers vector, volume fraction and size of nanoparticles respectively, φ is a constant with value of about 2. In the sample, $G_m$=about 16.4 GPa, b=about 0.32 nm, $V_p$=about 0.14, $d_p$=about 60 nm, and the calculated $\Delta\sigma_{Orowan}$ is about 113 MPa.

The rest of the strengthening should derive from load bearing. The strength increase due to load bearing can be calculated by the following equation:

$$\Delta\sigma_{load} = 1.5 V_p \sigma_i$$

where $\sigma_i$ is the interfacial bonding strength. To obtain about 262 MPa strengthening, the interfacial strength, $\sigma_i$, should be about 1250 MPa. This indicates that the interface between magnesium matrix and SiC nanoparticles is strong, which is verified by the high resolution TEM images, as shown in FIG. 3D.

Strengthening Mechanism in HPT-Processed Sample.

After HPT processing, the strength increase in samples with and without nanoparticles is about 300 MPa and about 280 MPa respectively. The strengthening should derive mainly from the Hall-Petch effect. The increased yield strength from Hall-Petch effect can be calculated by the following equation:

$$\Delta\sigma_y = k d^{-1/2}$$

where d is the grain size and k is a constant. The grain size in the samples with and without nanoparticles is about 64 nm and about 105 nm respectively. The smaller grain size in the sample with nanoparticles results in more strength enhancement as compared to the sample without nanoparticles.

Hall-Petch strengthening may break down at a certain grain size due to grain boundary rotation. The further observed strengthening with grain size smaller than about 100 nm may be because the ceramic nanoparticles prevent the grain boundary rotation or a critical grain size for Hall-Petch break down in this alloy is below about 60 nm.

Increase of Young's Modulus

The high volume fraction of SiC nanoparticles also provides a significant enhancement of Young's modulus from about 44 GPa in Mg$_2$Zn to about 86 MPa in Mg$_2$Zn-14 vol. % SiC. The significant Young's modulus increase is due to the very high Young's modulus of SiC (about 450 GPa) and the effective load bearing by the nanoparticles. The Young's modulus calculated by the rule of mixture is about 100 GPa in the Mg$_2$Zn-14 vol. % SiC sample, which is close to the value of about 86 GPa tested by microindentation experiment.

Mechanism of Self-Stabilization of SiC Nanoparticles in Molten Magnesium

The self-stabilization of SiC nanoparticles in magnesium melt is attributed to a synergy of reduced van der Waals force between nanoparticles, high thermal energy of nanoparticles, and a high energy barrier mitigating against nanoparticle sintering due to wettability between nanoparticles and molten magnesium, as schematically shown in FIG. 4.

Van Der Waals Attraction.

For two SiC nanoparticles in Mg melt at about 1000 K, the van der Waals interaction can be calculated by the following equation:

$$W_{vdw}(D) = -\frac{\left(\sqrt{A_{SiC}} - \sqrt{A_{Mg}}\right)^2}{6D}\left(\frac{R_1 R_2}{R_1 + R_2}\right)$$

where D is the distance between two nanoparticles, $A_{SiC}$ and $A_{Mg}$ are the Hamaker constants for the van der Waals interaction and are about 248 zJ and about 206 zJ respectively. $R_1$ and $R_2$ are radii of two nanoparticles. So the van der Waals interaction between two similar SiC nanoparticles with radius R in Mg is $$W_{vdw}(D) = -\frac{\left(\sqrt{248} - \sqrt{206}\right)^2}{6D}\frac{R}{2}$$

The unit of D and R is nm, the unit of $W_{vdw}$ (D) is zJ. The above equation is effective when two SiC nanoparticles interact through Mg medium when D is larger than two atomic layers (about 0.4 nm). The maximum attraction $W_{vdw}$ between two SiC nanoparticles in magnesium melt is about −12.17 zJ when D=about 0.4 nm. The low van der Waals attraction is due to the Hamaker constant of SiC being close to that of magnesium. If D is smaller than two atomic layers (about 0.4 nm) of Mg, the van der Waals interaction contributes to the interfacial energy of the system together with the interfacial chemical bonds.

Thermal Energy for Nanoparticle Dispersion.

The thermal energy of nanoparticles for Brownian motion, $E_b$, can be calculated by $$E_b = kT$$

where k is Boltzmann constant, T is the absolute temperature. At the processing temperature of about 1000 K, $E_b$ is about 13.8 zJ, which is larger than the maximum van der Waals attraction in the Mg—SiC system. Therefore, SiC nanoparticles will be dispersed in the Mg melt driven by thermal energy.

Energy Barrier Against Nanoparticle Sintering.

At high temperature, nanoparticles can sinter together when they come into contact, driven by a significant drop of interfacial energy. In the Mg—SiC system, when two nanoparticles approach each other and the distance D=about 0.2 nm, the last atomic layer of Mg is removed. The Mg—SiC interface will be replaced by SiC surface. The interfacial energy increase is given by:

$$W_{barrier} = S(\sigma_{SiC} - \sigma_{SiC-Mg}) = S\sigma_{Mg}\cos\theta$$

where S is the effective area, $\sigma_{SiC}$ is the surface energy of SiC, $\sigma_{SiC-Mg}$ is the interfacial energy between SiC and Mg melt, $\sigma_{Mg}$ is the surface energy of Mg melt, and $\theta$ is the contact angle of Mg melt on SiC surface. This equation shows a trend that, a greater wetting between nanoparticles and molten metal (a smaller $\theta$), the higher the energy barrier to mitigate against the nanoparticles contacting each other.

From reported values, the surface energy of liquid Mg is about 0.599 $J/m^2$, and the surface energy of SiC is about 1.45 $J/m^2$. The contact angle is about 83°. The interfacial energy between liquid Mg and SiC is about 0.422 $J/m^2$ according to Young's equation. According to the Langbein approximation, the effective interaction area of two spheres is S=πx R×$D_0$ (where $D_0$=about 0.2 nm). For two SiC nanoparticles with about 60 nm diameter, the interfacial energy increase will be about 3.87×$10^4$ zJ, which is more than about 2000 times higher than the thermal energy for Brownian motion. Thus, SiC nanoparticles have little probability to overcome the energy barrier to contact each other and sinter together. Therefore, dispersed SiC nanoparticles in Mg melt can remain dispersed.

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a value being "substantially" uniform can refer to a standard deviation of less than or equal to 10% of an average value, such as less than or equal to 5%, less than or equal to 4%, less than or equal to 3%, less than or equal to 2%, less than or equal to 1%, less than or equal to 0.5%, less than or equal to 0.1%, or less than or equal to 0.05%.

As used herein, the term "nanostructure" refers to an object that has at least one dimension in a range of about 1 nm to about 1000 nm. A nanostructure can have any of a wide variety of shapes, and can be formed of a wide variety of materials. Examples of nanostructures include nanowires, nanosheets, and nanoparticles.

As used herein, the term "nanoparticle" refers to a nanostructure that is generally or substantially spherical or spheroidal. Typically, each dimension of a nanoparticle is in a range of about 1 nm to about 1000 nm, and the nanoparticle has an aspect ratio of about 5 or less, such as about 3 or less, about 2 or less, or about 1.

As used herein, the term "nanowire" refers to an elongated nanostructure. Typically, a nanowire has a lateral dimension (e.g., a width) in a range of about 1 nm to about 1000 nm, a longitudinal dimension (e.g., a length) in a range of about 1 nm to about 1000 nm or greater than about 1000 nm, and an aspect ratio that is greater than about 5, such as about 10 or greater.

As used herein, the term "nanosheet" refers to a planar-like, nanostructure.

Additionally, concentrations, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A manufacturing method comprising:
forming a melt including one or more metals;
introducing nanostructures into the melt at an initial volume fraction of the nanostructures; and
by operating a vacuum pump, at least partially evaporating one or more metals from the melt so as to form a metal matrix nanocomposite including the nanostructures dispersed therein at a higher volume fraction than the initial volume fraction.

2. The manufacturing method of claim 1, wherein the nanostructures are introduced into the melt at the initial volume fraction of no greater than 3%.

3. The manufacturing method of claim 1, wherein the nanocomposite includes the nanostructures dispersed therein at the higher volume fraction of at least 5%.

4. The manufacturing method of claim 1, wherein the melt includes two or more different metals.

5. The manufacturing method of claim 1, wherein the melt includes magnesium and zinc.

6. The manufacturing method of claim 1, wherein the melt includes one or more of zinc, magnesium, aluminum, iron, nickel, silver, copper, manganese, titanium, chromium, cobalt, gold, and platinum.

7. The manufacturing method of claim 1, wherein introducing the nanostructures into the melt includes dispersing the nanostructures in the melt by agitation.

8. The manufacturing method of claim 1, wherein the nanostructures include ceramic nanoparticles or metallic nanoparticles.

9. The manufacturing method of claim 8, wherein the ceramic nanoparticles include a metal carbide or a non-metal carbide.

10. The manufacturing method of claim 1, wherein the nanostructures have at least one dimension in a range of 1 nm to 100 nm.

11. A manufacturing method comprising:
forming a carrier melt including at least one carrier metal;
introducing nanostructures into the carrier melt to form a carrier mixture;
forming a matrix melt including at least one matrix metal different from the carrier metal;
introducing the carrier mixture into the matrix melt to form a carrier and matrix mixture having an initial volume fraction of the nanostructures dispersed therein; and
by operating a vacuum pump, at least partially evaporating the carrier metal from the carrier and matrix mixture so as to form a metal matrix nanocomposite including the nanostructures dispersed therein at a higher volume fraction than the initial volume fraction.

12. The manufacturing method of claim 11, wherein the initial volume fraction of the nanostructures is no greater than 3%, and the higher volume fraction of the nanostructures is at least 5%.

13. The manufacturing method of claim 11, wherein a melting temperature of the matrix metal is greater than a melting temperature of the carrier metal.

14. The manufacturing method of claim 1, wherein at least partially evaporating the one or more metals from the melt is performed at a pressure at or below 100 Torr.

15. The manufacturing method of claim 11, wherein at least partially evaporating the carrier metal from the carrier and matrix mixture is performed at a pressure at or below 100 Torr.

* * * * *